United States Patent Office 2,777,882
Patented Jan. 15, 1957

2,777,882

DEHYDROCHLORINATION OF BENZENE HEXACHLORIDE

David D. Humphreys, Baton Rouge, La., assignor to Ethyl Corporation, New York, N. Y., a corporation of Delaware No Drawing. Application December 5, 1951, Serial No. 260,101

6 Claims. (Cl. 260—650)

This invention relates to the dehydrochlorination of organic chlorine compounds and more particularly to a new and improved catalytic method for the dehydrochlorination of benzene hexachloride and similar compounds, characterized by an unusual and novel distribution of products.

The dehydrochlorination of benzene hexachloride has been traditionally carried out by thermal treatment at temperatures in the vicinity of 275–500° C., usually in the presence of a catalyst, such as iron or ferric chloride. This is a suitable method for the preparation of trichlorobenzene, particularly when an outlet for the non-gamma isomers of benzene hexachloride is thereby provided. However, this procedure is inefficient in that large quantities of 1,2,3-trichlorobenzene, for which there exists no market outlet, are produced along with the desired 1,2,4-isomer. The 1,3,5-isomer is produced only in negligible amounts. The dehydrochlorination product, therefore, must be either purified by a difficult and costly fractionation operation or the crude mixture must be sold at a reduced premium. Another disadvantage of this method is that considerable carbonization of organic material takes place in the reaction zone. The carbonaceous material thereby formed is deleterious to the process in that it tends to foul process equipment, it represents a loss of potential yield of dehydrohalogenation product, and it adversely affects the reaction rate and the efficiency of the catalyst employed. The above method of dehydrochlorination of benzene hexachloride is also deficient in that the reaction sequence cannot be stopped at any of the intermediate products, but always proceeds to completion, with the formation of trichlorobenzene. Thus, valuable chemical intermediates and biocides present in the reaction mixture such as 2,3,4,5,6-pentachlorocyclohexene-1, are not recovered but are converted to the completely aromatized end-products.

Another method used for the dehydrochlorination of benzene hexachloride consists of heating the benzene hexachloride with a solution of alkali, such as sodium hydroxide or potassium hydroxide. This procedure is extremely inefficient in that the valuable hydrogen chloride produced in the dehydrochlorination is converted by the action of the alkali into relatively valueless sodium chloride or potassium chloride, respectively.

In the formation of benzene hexachloride by additive chlorination of benzene, varying amounts of monochlorobenzene hexachloride and dichlorobenzene hexachloride are normally formed. The dehydrochlorination of these compounds would lead to the formation of valuable products, such as tetrachlorobenzenes and pentachlorobenzene.

A principal object of my invention, therefore, is to provide a new and improved method for the dehydrochlorination of polychlorocyclohexanes. Another object is to provide a catalytic process for producing a mixture of trichlorobenzene in which 1,2,4-trichlorobenzene predominates over 1,2,3-trichlorobenzene to a degree not heretofore achieved.

Another object is to provide a method of dehydrochlorinating benzene hexachloride whereby a preponderant amount of 1,2,4-trichlorobenzene, together with 2,3,4,5,6-pentachlorocyclohexene-1, is formed. Another object is to provide a practicable means of producing 2,3,4,5,6-pentachlorocyclohexene-1 by the dehydrochlorination of benzene hexachloride. Still another object is to provide a method for increasing the rate of dehydrochlorination of benzene hexachloride. A further object is to provide a method for the dehydrochlorination of benzene hexachloride in which hydrogen chloride in high purity is produced as one of the products. Still another object is to provide a practicable means for the dehydrochlorination of heptachlorocyclohexane and octachlorocyclohexane.

I have discovered that polychlorocyclohexanes, such as benzene hexachloride, can be readily and efficiently catalytically dehydrochlorinated at a high reaction velocity to yield mixtures of isomeric polychlorobenzenes by contacting the polychlorocyclohexane with a selective, highly specific catalyst, as described hereafter. In the case of benzene hexachloride, the proportion of 1,2,4-trichlorobenzene in the product is markedly higher than has been obtained heretofore. Moreover, my invention can be carried out so that under certain conditions substantial quantities of polychlorocyclohexenes are obtained. The production of cyclic olefins under conditions which permit them to be isolated before being further dehydrochlorinated is an important feature of my invention.

By benzene hexachloride I mean either a total stereoisomeric mixture of 1,2,3,4,5,6-hexachlorocyclohexanes, such as is produced in the additive chlorination of benzene (hereafter designated as "crude" benzene hexachloride), or any of the individual 1,2,3,4,5,6-hexachlorocyclohexane stereoisomers or any mixture of two or more of the stereoisomeric 1,2,3,4,5,6-hexachlorocyclohexanes, including a mixture such as that arising when the gamma isomer has been removed from a total stereoisomeric mixture.

Catalysts which are suitable for use in my process comprise halide salts of metals from Groups I and IIA of the periodic table. These metals are commonly spoken of as "alkali" and "alkaline earth" metals. Examples of such compounds are sodium chloride, sodium bromide, sodium iodide, sodium fluoride, lithium chloride, potassium chloride, potassium bromide, barium chloride, barium iodide, calcium chloride, calcium bromide, magnesium chloride, strontium fluoride, etc. Compounds which under my reaction conditions are converted into halides of metals from the above groups are also catalysts in my invention. Such compounds include calcium oxide, barium hydroxide, sodium nitrite, lithium oxide, sodium acetate, calcium acetate, sodium oxide, sodium hydroxide, sodium ethylate, sodium n-propionate, sodium sulfide, sodium benzoate, potassium ferricyanide, barium carbonate and the like.

The amount of catalyst employed can be varied between a very low percentage, such as about 0.01 percent of the weight of polychlorocyclohexane to about 10 percent of the weight of polychlorocyclohexane. However, percentages greater than about 2 percent of the weight of polychlorocyclohexane provide only minor additional benefits, so I prefer to use proportions of catalyst not greater than about 2 percent of the weight of polychlorocyclohexane being treated.

Among the catalysts of my invention I prefer to use the chlorides for they are generally the most economical and most readily obtainable of the halogen salts.

When I contact benzene hexachloride as herein defined at a temperature of at least 180° C. with catalytic quantities of one of the specific and selective catalysts described above, I smoothly produce mixtures of 1,2,4- trichlorobenzene and 1,2,3-trichlorobenzene in which the ratio of the commercially important 1,2,4- isomer to 1,2,3- isomer is as high as 210 percent of the ratio obtained when old methods are used. When benzene hexachloride is dehydrochlorinated by thermal treatment in the absence of a catalyst the dehydrochlorination rates are greatly depressed below those in my process. I obtain equally advantageous results with other polychlorocyclohexanes, as enumerated herein.

My invention is operable over a wide range of temperatures. Temperatures of at least about 180° C. are preferably employed. Generally, in order to avoid excessive losses of polychlorocyclohexane by boiling, the temperature should be not higher than about 350° C. In the preferred process applications of my invention, I remove the liquid products produced by continuous distillation from the reaction mixture. Since the boiling point of 1,2,4-trichlorobenzene at normal pressures is about 213° C. and that of 1,2,3-trichlorobenzene is about 219° C., I prefer to operate at a temperature of at least about 220° C. My preferred range of temperature, therefore, lies between about 220° C. and 350° C.

My invention can be carried out as either a batch process or a continuous process. One variation of batch operation is described in Example I, below.

In the continuous embodiment, which is the preferred embodiment of my invention, molten or solid polychlorocyclohexane is continuously charged to a pot-type vessel or tube-type vessel containing a charge of catalyst or, alternatively, polychlorocyclohexane and catalyst can be charged to the vessel concurrently. Heat is applied to the vessel, and reaction products are continuously removed and recovered from the reaction mixture by distillation and subsequent condensation. Hydrogen chloride is continuously removed and collected in a hydrogen chloride scrubber. The mixture of products which comprises the distillate is resolved by fractional distillation or other means.

The following examples illustrate one mode of carrying out my invention and also point out the advantages and benefits of my invention. All parts and percentages are parts and percentages by weight in all examples.

Example I

To a reaction vessel equipped with a mechanical agitator, a temperature measuring device and a packed distillation column was charged 100 parts by weight of crude benzene hexachloride and one part by weight of barium chloride. To the top of the packed distilling column was connected a condenser, a variable take-off distilling head containing a temperature measuring device, a distillate cooler, and a tared hydrogen chloride absorber containing sodium hydroxide solution. The reaction vessel was heated by controlled external means, and the agitator was started as soon as the charge was fluid enough to be stirred. The reaction was considered to have started when hydrogen chloride fumes were observed. After a substantial reflux in the distillation column was established, distillate was taken off at a rate sufficient to maintain the reactor temperature at 290–310° C. during the major part of the run. The rate of dehydrochlorination was determined by periodic weighing of the amount of hydrogen chloride absorbed by the sodium hydroxide in the hydrogen chloride absorber. The 50 percent reaction time, that is, the time required for evolution of 50 percent of the theoretical amount of hydrogen chloride for complete conversion of the benzene hexachloride to trichlorobenzene, was used as the criterion for velocity of the dehydrochlorination reaction. The 50 percent reaction time in this example was 32 minutes. The temperature of the vapor in the takeoff head gradually rose from about 175° C. to about 214° C. during the course of the run. The yellow distillate was found by infrared analysis to comprise 38 parts of 1,2,4-trichlorobenzene and 6 parts of 1,2,3-trichlorobenzene. The ratio of 1,2,4-trichlorobenzene to 1,2,3-trichlorobenzene, therefore, was greater than 6:1.

When calcium chloride, magnesium chloride, strontium bromide, and the like, are used as catalysts in this procedure equally beneficial results are obtained.

Example II

Using the same procedure as in Example I, a mixture of 100 parts of crude benzene hexachloride and 1 part of sodium chloride was heated to a temperature of 285–310° C. The vapor temperature in the distillate takeoff ranged between 197–215° C. during the course of the reaction. The liquid product comprised 37 parts of 1,2,4-trichlorobenzene and 8 parts of 1,2,3-trichlorobenzene, or a ratio of 1,2,4-trichlorobenzene to 1,2,3-trichlorobenzene of almost 5:1.

Sodium bromide, potassium chloride, lithium chloride, sodium iodide and the like can be used as catalysts in this procedure with similar results.

Example III

Using the same procedure as in Example I, a mixture of 100 parts of crude benzene hexachloride and 1 part of cuprous chloride was heated to a reactor temperature of 285–345° C. The vapor temperature varied between 180–220° C. The liquid product mixture comprised 28 parts of 1,2,4-trichlorobenzene and 7 parts of 1,2,3-trichlorobenzene, together with substantial quantities of 2,3,4,5,6-pentachlorocyclohexene-1.

Silver chloride, silver bromide, cuprous bromide, and similar compounds give like results when used as catalysts in this procedure.

The following example illustrates results obtained when the catalyst is a compound which under my reaction conditions decomposes to give a halide of a group I metal.

Example IV

Using the procedure of Example I, a mixture of 100 part of crude benzene hexachloride and 1 part of sodium nitrite was heated to a temperature of 280–295° C. The 50 percent reaction time was 25 minutes. The vapor temperature varied between 160–205° C. The liquid reaction product comprised 31 parts of 1,2,4-trichlorobenzene and 6 parts of 1,2,3-trichlorobenzene.

When this procedure is repeated using barium oxide, lithium oxide, sodium acetate and the like as catalysts, substantially identical results are obtained.

When each of the above procedures is applied to alpha benzene hexachloride, gamma benzene hexachloride or the crude mixture from which gamma benzene hexachloride has been removed or to monochlorobenzene hexachloride or to dichlorobenzene hexachloride, substantially identical results are obtained.

In order that the contrast between my invention and prior means may be realized the following example presents results obtained when powdered iron is used as the catalyst.

Example V

Using the same procedure as in Example I, a mixture of 100 parts of crude benzene hexachloride and 3 parts of powdered iron was heated to a reactor temperature of 285–300° C. The ratio of 1,2,4-trichlorobenzene to 1,2,3-trichlorobenzene in the product mixture was only 2.9 to 1.

When benzene hexachloride is dehydrochlorinated thermally without the addition of a catalyst the 50 percent reaction time is slowed down to 63 minutes.

My invention is not limited by any of the specific examples cited herein but is limited only by the claims which are appended hereto.

I claim:

1. A process for the dehydrochlorination of a benzene hexachloride comprising contacting said benzene hexachloride at a temperature of at least 180° C. with less than 10 percent by weight of the benzene hexachloride of a catalytic compound represented by $$M_mX_x$$

wherein M is a metal selected from the group consisting of alkali and alkaline earth metals; X is a halide and $m$ and $x$ are small whole numbers.

2. The process of claim 1 wherein the catalytic compound is present in a quantity not over 2 percent by weight of the benzene hexachloride.

3. The process of claim 2 wherein the catalytic compound is sodium chloride.

4. The process of claim 2 wherein the catalytic compound is barium chloride.

5. The process of claim 1 wherein the halide is a chloride.

6. A process for the dehydrochlorination of a benzene hexachloride consisting in mixing the benzene hexachloride with 5 to 10% by weight of calcium oxide and heating the mixture to a temperature between about 200° and 300° C.

References Cited in the file of this patent

UNITED STATES PATENTS 2,569,441    Alquist et al.    Oct. 2, 1951

FOREIGN PATENTS 993,097    France    July 18, 1951